US012185435B2

(12) United States Patent
Burton

(10) Patent No.: US 12,185,435 B2
(45) Date of Patent: Dec. 31, 2024

(54) SUPPORT ARRANGEMENT FOR MOUNTING ELECTRIC HEATING ELEMENTS

(71) Applicant: Alleima Limited, London (GB)

(72) Inventor: Daniel Burton, London (GB)

(73) Assignee: Alleima Limited, London (GB)

( * ) Notice: Subject to any disclaimer, the term of this patent is extended or adjusted under 35 U.S.C. 154(b) by 0 days.

(21) Appl. No.: 18/711,756

(22) PCT Filed: Nov. 28, 2022

(86) PCT No.: PCT/EP2022/083552

§ 371 (c)(1),
(2) Date: May 20, 2024

(87) PCT Pub. No.: WO2023/094678

PCT Pub. Date: Jun. 1, 2023

(65) Prior Publication Data

US 2024/0334556 A1 Oct. 3, 2024

Related U.S. Application Data

(60) Provisional application No. 63/283,689, filed on Nov. 29, 2021.

(30) Foreign Application Priority Data

Nov. 29, 2021 (EP) .................................... 21211163

(51) Int. Cl.
*H05B 3/66* (2006.01)
*F27D 11/02* (2006.01)
*F27D 99/00* (2010.01)

(52) U.S. Cl.
CPC ............... *H05B 3/66* (2013.01); *F27D 11/02* (2013.01); *F27D 99/0006* (2013.01); *F27D 2099/0008* (2013.01)

(58) Field of Classification Search
CPC .... H05B 3/06; H05B 3/08; H05B 3/66; F27D 99/0006; F27D 2099/0008
See application file for complete search history.

(56) References Cited

U.S. PATENT DOCUMENTS 1,692,479 A * 11/1928 Weintz ..................... H05B 3/66 373/130
1,742,286 A * 1/1930 Shaw ....................... H05B 3/66 373/130

(Continued)

FOREIGN PATENT DOCUMENTS

GB 257949 A 3/1928
GB 411105 A 5/1934

(Continued)

OTHER PUBLICATIONS

International Search Report and Written Opinion dated Feb. 21, 2023, issued in corresponding International Patent Application No. PCT/EP2022/083552.

*Primary Examiner* — John J Norton
(74) *Attorney, Agent, or Firm* — Morgan, Lewis & Bockius LLP

(57) ABSTRACT

A support arrangement (10) for mounting electric heating elements (5, 7) in a furnace (1). The support arrangement (10) comprises a first insulating body (11), a second insulating body (21), a detachably arranged cover body (30) or cover assembly (60), and a support structure (40). A cavity (15) is formed between the first insulating body (11) and a second insulating body (21) into which the heating elements (5, 7) extend to thereby allow electrical connection to a power source. Each of the first insulating body (11) and a second insulating body (21) comprises at least one longitudinal slot (13, 23) arranged in a first surface facing towards (Continued)

the interior of the furnace (1) to thereby allow insertion of a heating element into the support arrangement (10) from the interior of the furnace (1).

15 Claims, 6 Drawing Sheets

(56) References Cited

U.S. PATENT DOCUMENTS

| | | | | | |
|---|---|---|---|---|---|
| 1,839,613 | A | | 1/1932 | Swoboda et al. | |
| 1,873,053 | A | | 8/1932 | Shaw | |
| 2,992,286 | A | * | 7/1961 | Smit et al. | H05B 3/62 219/388 |
| 4,080,510 | A | | 3/1978 | Beck | |
| 5,335,310 | A | * | 8/1994 | Novy | F27D 99/0006 373/128 |

FOREIGN PATENT DOCUMENTS

| | | | |
|---|---|---|---|
| GB | 590675 | A | 7/1947 |
| GB | 2079120 | A | 1/1982 |
| JP | 2015-028924 | A | 2/2015 |
| KR | 10-0972500 | B1 | 7/2010 |

* cited by examiner

SUPPORT ARRANGEMENT FOR MOUNTING ELECTRIC HEATING ELEMENTS

TECHNICAL FIELD

The present disclosure relates in general to a support arrangement for mounting electric heating elements in a furnace.

BACKGROUND

Silicon carbide heating elements are well known in the field of electrical heating elements and electric furnaces. Silicon carbide heating elements have many advantages. For example, they may be used in many different types of atmospheres and generally allow element temperatures up to about 1650° C., and can thus be used in a large variety of furnaces. Moreover, silicon carbide elements can have a substantial length, such as up to about 5 meters or even longer, without risk of distortion due to the temperature to which they are subjected during use due to their temperature stability. However, one disadvantage with silicon carbide heating elements is that they may not be bent after being sintered during production, and are therefore often in the form of straight rod shaped elements. If other element shapes are desired, such as U-shaped elements, such elements need to be produced by joining different portions of the elements together. This may in turn increase the manufacturing cost of the heating elements.

Silicon carbide heating elements generally comprises at least one hot zone and at least two cold ends. The hot zone may typically have a higher resistance compared to the resistance of the cold ends. The cold ends are configured to extend through the wall of the furnace so as to be connected to terminals on the outside of the furnace. Thus, silicon carbide heating elements are mounted such that they extend through the walls of the furnace.

Solutions for mounting of silicon carbide heating elements in furnaces are known from for example U.S. Pat. No. 4,080,510, GB411105A, and GB257949A.

Although silicon carbide heating elements may have a substantial length, it may sometimes be desired to be able to arrange a plurality of heating elements successively along a horizontal or vertical longitudinal axis in the furnace. One example of such a situation is in case of large furnaces where the heating element may have an insufficient length to extend between and through two opposing walls of the furnace. Another example is in case where it may be inappropriate with sufficiently long heating element to extend between two opposing walls due to difficulties associated with the length of the heating elements during installation or replacement thereof. Silicon carbide heating elements are in general brittle and thus sensitive to impact with other objects, such as the furnace wall or an adjacent heating element. An impact with another object may lead to brittle fracture of the heating element. Maneuvering a long heating element during installation from the outside of the furnace while avoiding contact between the heating element with another object may be extremely difficult.

In order to be able to arrange a plurality of silicon carbide heating elements successively along a longitudinal axis of the furnace, the silicon carbide heating elements would need to comprise bends to allow the cold ends of the element to extend through the furnace wall. This may however be undesired due to the increased cost for the heating elements. Furthermore, this would result in many openings through the furnace wall (one for each cold end of the respective heating elements) as well as many terminals, which in turn increases the heat loss and thus process economy of the furnace. Therefore, silicon carbide heating elements are often not considered to be a suitable option for such furnaces where there is a need to arrange heating elements successively. This is unfortunate since other types of heating elements may not possess the same advantages as silicon carbide heating elements, such as temperature stability, possible element temperatures and/or possible atmospheres where the heating elements may be used.

U.S. Pat. No. 1,873,053 discloses an electrical heating apparatus, adapted for use as hot-plates or cookers, said apparatus embodying a mounting device for heating elements which insure mechanical support and electrical connection of the heating elements to a supply circuit. This document describes an embodiment wherein two heating elements are arranged successively along a common axis with a conductive block arranged in-between. The conductive block comprises recesses intended for the reception of terminal portions of heating elements which have butt-end engagement with the walls of the recesses. The opposite ends of the heating elements are supported by and in releasable engagement with terminal mountings. The described mounting of the heating elements however relies on electrically connecting the heating elements in series, which may not be suitable or desired in larger industrial furnaces and/or long silicon carbide heating elements. More specifically, the described mounting device does not allow for electrical connection of each of the terminal ends of heating elements to a power source via a respective terminal when said heating elements are arranged successively along a common longitudinal axis.

SUMMARY

The aspect of the present invention is to provide a solution which enables arranging a plurality of heating elements, such as silicon carbide heating elements, successively along an axis of a furnace without increasing the cost of the heating elements or reducing the process economy during operation of the furnace.

The aspect is achieved by the subject-matter of the appended independent claim(s).

In accordance with the present disclosure, a support arrangement for mounting heating elements in a furnace is provided. More specifically, the support arrangement is configured for mounting heating elements such that the heating elements extend out from the support arrangement in a longitudinal direction of the support arrangement. The support arrangement comprises a first insulating body having a first surface configured to face the interior of the furnace. The first surface of the first insulating body comprises a first longitudinal slot, said first longitudinal slot having a configuration adapted to allow insertion of a first heating element into the first insulating body in a direction perpendicular to the longitudinal direction of the support arrangement. The support arrangement further comprises a second insulating body having a first surface configured to face the interior of the furnace. The first surface of the second insulating body comprises a second longitudinal slot, said second longitudinal slot having a configuration adapted to allow insertion of a second heating element into the second insulating body in a direction perpendicular to the longitudinal direction of the support arrangement. The support arrangement further comprises a support structure configured to support the first insulating body and/or the second insulating body in the furnace. Said support structure is further configured to at least partly extend into a wall of the furnace when the support arrangement is arranged in the furnace. The second insulating body is, in a longitudinal direction of the support arrangement, arranged at a distance from the first insulating body so as to form a cavity between the first insulating body and the second insulating body through which each of the first heating element and the second heating element may be electrically connected to a power source via a respective terminal. The support arrangement further comprises a detachably arranged cover body or a detachably arranged cover assembly. The cover body or the cover assembly is adapted to, when mounted in the support arrangement, extend over the first surface of the first insulating body and the first surface of the second insulating body so as to form a wall of said cavity.

The present support arrangement allows mounting of a first heating element and a second heating element inside a furnace, by means of the support arrangement, such that they extend longitudinally one after another. Thus, the support arrangement enables mounting of for example silicon heating elements also in very large furnaces where the heating elements may have an insufficient length to be able to extend through two opposing furnace walls. Moreover, the present support arrangement allows installation of heating elements from the inside of the furnace (in contrast to installation from the outside of the furnace). This in turn significantly facilitates the insertion of the heating elements into place, also in case of very long heating elements, without the risk for hitting the heating elements against another object which in turn may lead to fracture or damage of the heating element. Furthermore, the cavity of the support arrangement results in a thermally insulated volume into which the cold ends of the heating elements may extend and safely be electrically connected to a power source arranged outside of the furnace. Thus, the heating elements need not be provided with bends to allow them to extend to the outside of the furnace. Thereby, the number of through openings in the furnace wall as well as number of terminals may be reduced, which in turn minimizes thermal losses and thereby improve the operational economy of the furnace. Additionally, the present disclosure maximizes the volume of what is called the hot zone and reduces the number of terminal.

The first insulating body and the second insulating body may be arranged relative each other such that the cavity is adapted to extend through the wall of the furnace when the support arrangement is arranged in the furnace. Thereby, easy access to the cavity from outside of the furnace may be achieved without substantially increasing the risk for thermal loss. Furthermore, this may facilitate keeping a low temperature inside the cavity since it may be open to the surroundings of the furnace. Thus, if cooling is necessary this will provide for that separate cooling of the cavity may be avoided.

Each of the first insulating body and second insulating body may be configured to extend through the wall of the furnace when the support arrangement is arranged in the furnace. Thereby, an easy configuration of the support arrangement is enabled which allows the cavity to extend through the wall of the furnace to the outside. Furthermore, this may facilitate keeping a low temperature inside the cavity.

The first longitudinal slot may extend through the first insulating body in the longitudinal direction of the support arrangement. Alternatively, or additionally, the second longitudinal slot may extend through the second longitudinal body in the longitudinal direction of the support arrangement. Thereby, insertion and removal of heating elements is facilitated since the heating elements need to be moved only in one direction while still allowing the cold ends of the heating elements to extend into the cavity.

The first longitudinal slot may have a cross-sectional shape, when seen in a plane perpendicular to the longitudinal direction of the support arrangement, comprising a first portion having a circular shape and a second portion having a trapezoid shape, the second portion at least partly having a width parallel to the first surface which is smaller than the diameter of the first portion, said second portion opening up in the first surface of the first insulating body. Said first portion may be configured to allow insertion of a mounting sleeve, in a direction along or parallel to the longitudinal direction of the support arrangement, into the first longitudinal slot for the purpose of mounting the first heating element in the support arrangement when said first heating element has been inserted into the first insulating body. Thereby, the first heating element may be securely retained in place in the support arrangement.

The support structure of the support arrangement may comprise a first support plate arranged at an upper side of the cavity, as seen in the longitudinal direction of the support arrangement, and in parallel to a second surface of the first insulating body, said second side of the first insulating body facing the cavity. The support structure may further comprise a second support plate arranged at a lower side of the cavity, as seen in the longitudinal direction of the support arrangement. Moreover, the support structure may comprise at least one support member connecting the first support plate with the second support plate, the at least one support member having a longitudinal extension parallel to the longitudinal direction of the support arrangement. Thereby, the first insulating body and second insulating body may be sufficiently supported by the support structure.

The above-mentioned support member may extend through the cavity and/or wherein the at least one support member forms a wall of said cavity. Thus, the support member may ensure that the first and second insulating bodies are arranged at a distance to each other so as to form the cavity.

The cover body or the cover assembly may be configured to be detachably mounted to the support structure by at least one fastening device. Thereby, the cover body or the cover assembly may be securely held in place when mounted in the support structure as well as removed when there is a desire for replacement of one or more of the heating elements. Furthermore, when the cavity extends through the wall, mounting the cover body or the cover assembly to the support structure may allow loosening the cover body or the cover assembly from the outside of the furnace if desired.

The cover body or the cover assembly may comprise a longitudinal protrusion configured to, when the cover body or the cover assembly is mounted in the support arrangement, extend into the first longitudinal slot so as to interact therewith in a male-female relationship. Thereby, it is ensured that the cavity is thermally insulated from the interior of the furnace without the need for a separate component to fill out the otherwise open part of the first longitudinal slot when the heating element has been inserted into the first longitudinal slot. The longitudinal protrusion may be configured to also extend into the second longitudinal slot so as to interact therewith in a male-female relationship. Alternatively, the cover body or the cover assembly may comprise a plurality of longitudinal protrusions, each configured to interact with a corresponding longitudinal slot of the first and second insulating bodies in a male-female relationship.

The first longitudinal slot and the second longitudinal slot may be arranged along a common longitudinal axis in the support arrangement. Thereby, the first and second heating elements may be arranged successively along a common longitudinal axis. Furthermore, arranging the longitudinal slots along a common longitudinal axis facilitates the manufacture of the support arrangement since the first insulating body and the second insulating body may have the same configuration, albeit being arranged in the support arrangement in mirror to each other.

The first surface of the first insulating body may comprise a plurality of said first longitudinal slot arranged in parallel to each other, each longitudinal slot of said plurality of first longitudinal slot having a configuration adapted to allow insertion of a respective heating element into the first insulating body in a direction perpendicular to the longitudinal direction of the support arrangement. Thereby, the support arrangement may be used for mounting a plurality of heating elements in parallel to each other. Naturally, the first surface of the second insulating body may in such a case also comprise a plurality of said second longitudinal slot arranged in parallel to each other, each longitudinal slot of said plurality of second longitudinal slot being adapted to allow insertion of a respective heating element into the second insulating body in a direction perpendicular to the longitudinal direction of the support arrangement.

The first insulating body and the second insulating body may have the same geometrical configuration, but the second insulating body being arranged so as to mirror the first insulating body relative to a plane perpendicular to the longitudinal direction of the support arrangement.

According to embodiments, each of the first heating element and the second heating element are silicon carbide heating elements. Furthermore, each of the first heating element and the second heating element may be straight element. Alternatively, the first heating element and the second heating element may be U-shaped elements. Alternatively, the first heating element may be a straight heating element and the second heating element may be U-shaped heating element or vice versa. In such a case, the first surface of the first insulating body comprises at least two of said first longitudinal slots such that both cold ends of the U-shaped element may extend into the cavity. Furthermore, the first surface of the second insulating body comprises in such a case at least two of said second longitudinal slot.

Moreover, the present disclosure provides a furnace comprising at least one of the above-described support arrangement. Suitably, the furnace comprises a plurality of the above described support arrangement. Said support arrangements may be arranged side by side such that the longitudinal directions of the support arrangements are parallel to each other. The support arrangements may be arranged along an interior circumference of the furnace. The furnace may further comprise a plurality of heating elements which in at least one end of the heating elements is mounted in the furnace by the support arrangement. The other end of the heating elements may be mounted by a second support arrangement of the type described herein inside the furnace, by another type of support arrangement in the furnace, or be arranged to extend through other wall of the furnace so as to be mounted on the outside of the furnace.

The support arrangement may be arranged in the furnace such that the longitudinal direction of the support arrangement is parallel with a wall of the furnace.

Moreover, the support arrangement may be arranged in the furnace such that the longitudinal direction of the support arrangement is parallel with a longitudinal axis of the furnace.

DETAILED DESCRIPTION

Figure 1:
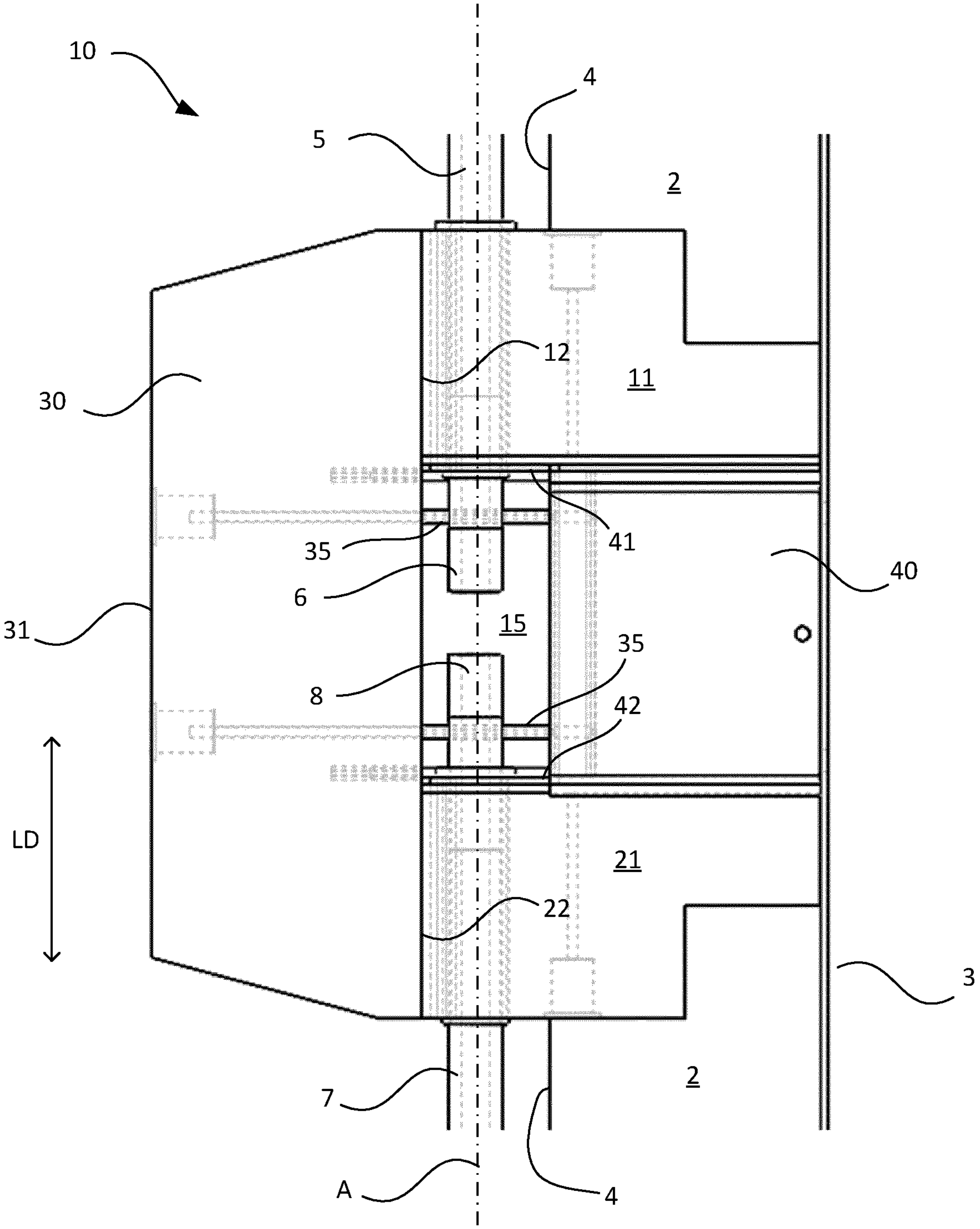
FIG. 1 illustrates a side view of a first exemplifying embodiment of the support arrangement according to the present disclosure when arranged in a furnace and supporting a first heating element and a second heating element.

The invention will be described in more detail below with reference to exemplifying embodiments and the accompanying drawings. The invention is however not limited to the exemplifying embodiments discussed and/or shown in the drawings, but may be varied within the scope of the appended claims. Furthermore, the drawings shall not be considered drawn to scale as some features may be exaggerated in order to more clearly illustrate the invention or features thereof.

The support arrangement according to the present disclosure is adapted for mounting electric heating elements in an industrial furnace. The support arrangement is primarily developed for mounting of silicon carbide heating elements, but may if desired also be used for mounting other types of heating elements. The support arrangement has a longitudinal direction. The longitudinal direction of the support arrangement is herein used to describe a direction parallel with, or coinciding with, the longitudinal axis of the support arrangement. When the support arrangement is arranged in a furnace, the longitudinal direction of the support arrangement is essentially parallel with a wall of the furnace. The support arrangement is particularly suitable for vertical installation of heating elements. In such a case, the support arrangement may be arranged in the furnace such that the longitudinal direction of the support arrangement is parallel with a vertical direction of the furnace. The support arrangement may however also be used for horizontal installation of heating elements. In such a case, the support arrangement may be arranged in the furnace such that the longitudinal direction of the support arrangement is parallel with to a horizontal direction of the furnace. A horizontal or vertical direction of the furnace is herein intended to mean the direction of the furnace in relation to the support/ground on which the furnace stands. It is naturally also possible to use the support arrangement according to the present disclosure for other than vertical or horizontal installations of heating elements, in which case the heating elements would be inclined with respect to the vertical and horizontal directions of the furnace.

When a first and a second heating element have been mounted in the support arrangement described herein, these heating elements will extend out from the support arrangement in the longitudinal direction of the support arrangement, but in opposite directions from the support arrangement. In other words, the support arrangement is configured for mounting a first heating element such that said first heating element extends out of the support arrangement in a first direction, said first direction being parallel (or coinciding) with the longitudinal direction of the support arrangement, and a second heating element such that said second heating element extends out of the support arrangement in a second direction, said second direction being parallel with the longitudinal direction of the support arrangement and being opposite to the first direction. The first direction and the second direction may be along a common axis, but the present disclosure is not limited thereto.

The support arrangement according to the present disclosure comprises a first and a second insulating body, each having a first surface configured to face towards the interior of the furnace and comprising a longitudinal slot adapted to allow insertion of a heating element into the respective insulating body in a direction perpendicular to the longitudinal direction of the support arrangement. In other words, each of the longitudinal slot of the first insulating body and the longitudinal slot of the second insulating body has a configuration adapted to allow insertion of a heating element (during installation) in a direction perpendicular to the longitudinal direction of the support arrangement. Thereby, it is possible to install and replace heating elements from the inside of the furnace instead of, for example, feeding the heating element into the furnace through a narrow through-opening in the roof or wall of the furnace. Installation/replacement of heating elements from the interior of the furnace is particularly advantageous in case of brittle heating elements and/or heating elements having a considerable length.

The first and second insulating bodies may each be made of a thermal insulating material. Such a thermal insulating material may be any previously known material used for said purpose. For example, the thermally insulating material may be an alumina and/or silicon dioxide based material.

The first and second insulating bodies are arranged at a distance from each other in the longitudinal direction of the support arrangement so as to form a cavity therebetween through which each of a first heating element (when inserted into the first insulating body) and a second heating element (when inserted into the second insulating body) may be electrically connected to a power source via a respective terminal. Each of the first and second insulating bodies may be configured to at least partly extend into a first wall of the furnace when the support arrangement is arranged in the furnace.

The support arrangement further comprises either a detachably arranged insulating cover body or a detachably arranged insulating cover assembly. The cover body/cover assembly is adapted to, when mounted in the support arrangement, extend over the first surface of the first insulating body and the first surface of the second insulating body so as to form a wall of said cavity. The arrangement of the first and second insulating bodies together with the cover body/cover assembly thus forms a cavity which is thermally insulated from the interior of the furnace. Thereby, the terminal ends of the heating elements extending into said cavity may be kept at a suitable temperature allowing them to be safely electrically connected to a power source arranged on the outside of the furnace. The cover body, or (at least some of the) constituent parts of the cover assembly, may for example be made of the same material as the material of the first and second insulating bodies.

The support arrangement further comprises a support structure configured to support the first insulating body and/or the second insulating body in the furnace. The support structure is further configured to at least partly extend into a wall of the furnace when the support arrangement is arranged in the furnace. The support structure may also be configured to carry the weight of the heating elements. Furthermore, the support structure is suitably arranged in the support arrangement such that it is thermally insulated from the interior of the furnace. Thereby, the support structure may be made of metal which is an appropriate selection of material in order to ensure that the support structure have sufficient capacity for carrying the load of the support arrangement as well as the heating elements. For example, the support structure may be thermally insulated from the interior of the furnace by being arranged inwardly of the first and second insulating bodies as well as the insulating cover body or the insulating cover assembly. The support structure may for example be mounted to the wall of the furnace either inside the wall or on the outside of the furnace.

The heating elements may suitably be straight heating elements. In other words, the heating elements may be in the shape of solid or tubular rods without any bends, said solid or tubular rods suitably having a substantially constant diameter along the longitudinal extension thereof. The heating elements may have a longitudinal extension (i.e. a length) of at least 1 meter. The support arrangement according to the present disclosure is particularly suitably for mounting even longer heating elements, such as heating elements having a length of at least 3 meters or even at least 4.5 meters. Other shapes and/or lengths of the heating elements are however also plausible. For example, the heating elements may have a U-shape and/or be tubular where the hot zone of the heating element comprises a helical cut. Heating elements comprising a hot zone comprising a helical cut are for example offered by Kanthal under the tradename Globar® SG element.

The present disclosure further relates to a furnace comprising the support arrangement as described herein. Typically, a plurality of the herein described support arrangement may be arranged along an inner circumference of the furnace or at least side by side along one wall of the furnace.

FIG. 1 illustrates a side view of a first exemplifying embodiment of the support arrangement 10 according to the present disclosure. In the figure, the support arrangement 10 is shown when arranged in a furnace, illustrated by a wall 2 of the furnace 1 shown in cross section. Said furnace wall 2 comprises an outer surface 3 facing the exterior of the furnace 1 and an inner surface 4 facing the interior of the furnace 1. The support arrangement 10 is further shown when supporting a first heating element 5 and a second heating element 7. In other words, the figure illustrates the support arrangement 10 when it is used for mounting electric heating elements in a furnace 1. As evident from the figure, the first heating element 5 and the second heating elements 7 may be arranged successively along a longitudinal axis A, said longitudinal axis A corresponding to a longitudinal axis of the furnace 1 and being essentially parallel to the wall 2 of the furnace 1. It should here be noted that the furnace wall 2, the first heating element 5 and the second heating element 7 are not part of the support arrangement 10 as such.

The support arrangement 10 comprises a first insulating body 11, a second insulating body 21, an insulating cover body 30 and a support structure 40. The support structure 40 may be configured to support the first insulating body 11 and the second insulating body 21. Alternatively, the support arrangement 10 may comprise a first support structure arranged so as to support the first insulating body 11 and a second support structure configured to support the second insulating body 21. The support structure(s) is/are configured to at least partly extend into the wall 2 of the furnace 1 when the support arrangement 10 is arranged in the furnace 1, and may be configured to be mounted for example to the wall 2 of the furnace 1. A possible configuration of the support structure 40 will be further explained with reference to other exemplifying embodiments described below.

The first insulating body 11 and the second insulating body 21 are arranged at a distance from each other in the longitudinal direction of the support arrangement 10 so as to form a cavity 15 between the first and second insulating bodies 11, 21. The longitudinal direction of the support arrangement 10 is in FIG. 1 illustrated by the double arrow LD. The cavity 15 provides a volume which may be thermally isolated from the interior of the furnace by virtue of at least the first insulating body 11, the second insulating body 21 and the cover body 30. The first heating element 5 and the second heating element 7 may, when supported by the support arrangement 10, be arranged such that the cold ends 6, 8 thereof extend through the first and second insulating bodies 11, 21, respectively. The cold ends 6, 8 of the heating elements may, through said cavity 15, be electrically connected to a power source (arranged outside of the furnace) via a respective terminal (not shown).

The first insulating body 11 comprises a first surface 12 configured to face towards the interior of the furnace. Likewise, the second insulating body 21 comprises a first surface 22 configured to face towards the interior of the furnace. The cover body 30 also comprises a first surface 31 configured to face the interior of the furnace. The cover body 30 is detachably arranged in the support arrangement 10 such that it may be temporarily removed during for example replacement of the heating elements. The cover body 30 may for example be configured to be detachably mounted in the support arrangement 10 by being detachably mounted to the support structure 40 by at least one fastening device 35. When the cover body 30 is mounted in the support arrangement 10, as shown in FIG. 1, the cover body 30 extends over the first surface 12 of the first insulating body 11 as well as over the first surface 22 of the second insulating body 21 so as to form a wall of the cavity 15. More specifically, a surface of the cover body, opposite the first surface 31 which faces the interior of the furnace, abuts said surfaces 12, 22. In the figure, the cover body 30 is shown to extend over the entire first surface 12 of the first insulating body 11 as well as the entire first surface 22 of the second insulating body 21. The present disclosure is however not limited thereto, and the cover body 30 need, when mounted in the support arrangement 10, only extend over a portion of said first surfaces 12, 22 as long as it provides a wall to the cavity 15 and ensures that the cavity 15 is sufficiently thermally insulated from the interior of the furnace.

Each of the first insulating body 11 and the second insulating body 21 may, when the support arrangement 10 is arranged in a furnace, be configured to extend from the interior of the furnace at least partly into the wall 2 of the furnace. As shown in FIG. 1, the first insulating body 11 and the second insulating body 21 may be configured to extend through the wall 2 of the furnace 1. Furthermore, the support arrangement 10 may have a configuration such that the cavity 15 may extend through the wall 2 of the furnace 1.

The first surface 12 of the first insulating body 11 comprises a first longitudinal slot 13 (not shown in FIG. 1, compare with FIG. 3) adapted to allow insertion as well as removal of the first heating element 5 into the first insulating body 11 in a direction perpendicular to a longitudinal direction LD of the support arrangement 10 when the cover body 30 has been detached from the support arrangement 10. More specifically, said longitudinal slot allows the first heating element 5 to be inserted in a direction which is, in addition to perpendicular to the longitudinal direction of the support arrangement 10, perpendicular to the wall 2 of the furnace 1. The first longitudinal slot 13 may suitably extend through the first insulating body 11 in the longitudinal direction of the support arrangement 10. It however also plausible that the first longitudinal slot 13 in the first surface 11 has an extension in the longitudinal direction of the support arrangement 10 such that it does not extend through the first insulating body 11. In such a case, when inserting the first heating element 5, the heating element is firstly moved in the direction perpendicular to the longitudinal direction of the support arrangement 10 so as to be inserted via the longitudinal slot until it reaches a cylindrical portion at the bottom of the longitudinal slot, and wherein said cylindrical portion further extends through the remaining portion of the first insulating body 11 to thereby allow the heating element to be moved in the longitudinal direction of the support arrangement such that it arrives in a position where the cold end of the heating element extends into the cavity 15.

Furthermore, the first surface 22 of the second insulating body 21 comprises a second longitudinal slot 23 (compare with FIG. 3) configured to allow insertion as well as removal of the second heating element 7 in a direction perpendicular to the longitudinal direction of the support arrangement when the cover body 30 has been detached from the support arrangement 10. Similarly to the first longitudinal slot 13 described above, the second longitudinal slot 23 may be configured to extend through the second insulating body 21 in the longitudinal direction of the support arrangement 10. Alternatively, the second longitudinal slot 23 may have an extension in the longitudinal direction of the support arrangement 10 which is shorter than the extension first surface 22 of the second insulating body 21 in the longitudinal direction of the support arrangement 10.

Thus, the support arrangement 10 is configured to allow insertion and removal of heating elements from the interior of the furnace by virtue of the first longitudinal slot 13 and the second longitudinal slot 23, respectively. Said first and second longitudinal slots 13, 23 may be arranged along a common longitudinal axis in the support arrangement 10. Thereby, the first and second heating elements 5, 7 will, when mounted in the furnace, be arranged successively along a common longitudinal axis A.

It should here be noted that the first insulating body 11 and the second insulating body 21 may have the same geometrical configuration, but the second insulating body 21 arranged so as to mirror the first insulating body 11 along a plane perpendicular to the longitudinal direction of the support arrangement 10.

Figure 2:
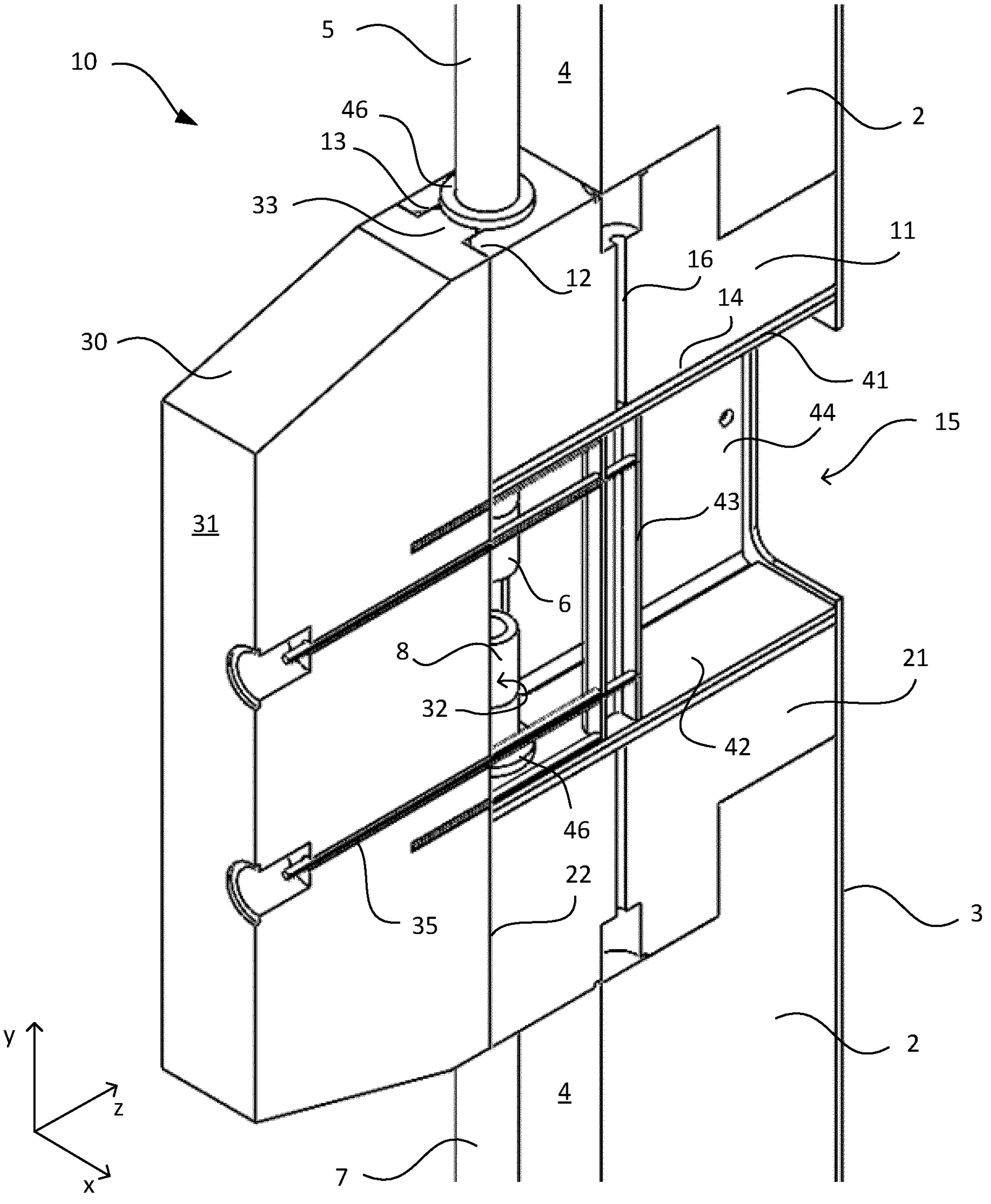
FIG. 2 illustrates a perspective view of a second exemplifying embodiment of the support arrangement according to the present disclosure in a cross section taken at half the width of the support arrangement.

FIG. 2 illustrates a perspective view of a second exemplifying embodiment of the support arrangement 10 according to the present disclosure, here in a cross section taken at half the width of the support arrangement 10, when arranged in a furnace. The second exemplifying embodiment corresponds to the first exemplifying embodiment shown in FIG. 1 with the exception that it is configured to support two of said first heating element 5 and two of said second heating element 7.

In FIG. 2, only one first heating element 5 and only one second heating element 7 are shown since the support arrangement 10 is shown when cut in half in the width direction. The support arrangement 10 has a longitudinal direction in the y-direction illustrated by the coordinate system in the bottom left of the figure. The support arrangement 10 further has a width in the x-direction and a thickness in the z-direction.

As shown in the figure, the cold end 6 of the first heating element 5 extends though the first insulating body 11 into the cavity 15, and the cold end 8 of the second heating element 7 extends through the second insulating body 21 into the cavity 15. Moreover, the cavity extends through the wall 2 of the furnace and may thus be open to the surrounding environment outside the furnace, if desired. This may further assist in keeping the volume in the cavity at a suitable temperature without having the need for installing any additional cooling arrangement. Thereby, the heating elements 5, 7 may be safely connected to a power source by a respective terminal (not shown).

Moreover, the constituent parts of the support structure 40 are more clearly shown than in FIG. 1. The support structure 40 may comprise a first support plate 41 arranged on one side of the cavity 15 as seen in the longitudinal direction of the support arrangement 10, such as an upper side of the cavity. Said first support plate may be arranged in parallel to a second surface 14 of the first insulating body 11, said second side 14 of the first insulating body 11 facing the cavity 15. In other words, said second surface 14 of the first insulating body 11 faces downwards in the figure. The second surface 14 may be perpendicular to the first surface 12 of the first insulating body 11, or may be angled relative to the first surface 12. The first and second surfaces 12, 14 of the first insulating body are however connected to each other by an edge of the first insulating body 11. Said edge may typically be configured to extend parallel to the wall 2 of the furnace. The first insulating body 11 may be mounted to the first support plate 41, for example by a fastening device (not shown) extending in an opening 16 of the first insulating body 11.

The support structure 40 may further comprise a second support plate 42 arranged on an opposite side of the cavity 15 to the first support plate 41 as seen in the longitudinal direction of the support arrangement, such as a lower side of the cavity. The second insulating body 21 may be mounted to the second support plate 42 in the same way as described above with regard to the first insulating body and the first support plate 41.

Each of the first support plate 41 and the second support plate 42 may be arranged substantially perpendicular to the longitudinal direction of the support arrangement. In such a case, the first and second support plates 41, 42 would also be arranged essentially parallel to each other. Alternatively, one or both of the first and second support plates 41, 42 may be arranged so as to have an inclination relative to a respective plane which is perpendicular to the longitudinal direction of the support arrangement.

The support structure 40 may further comprise a first support member 43 connecting the first support plate 41 with the second support plate 42. Said first support member 43 may suitably have a longitudinal extension parallel to the longitudinal direction of the support arrangement 10. As shown in the figure, the first support member may extend through the cavity 15. Said first support member 43 may further be used for the purpose of detachably mounting the cover body 30 to the support structure 40 by usage of at least one fastening device 35. Alternatively, or additionally, the support structure may comprise at least one second support member 44 connecting the first support plate 41 with the second support plate 42 and having a longitudinal extension parallel to the longitudinal direction of the support arrangement 10. Said second support member 44 may be arranged so as to form a wall of the cavity 15. An additional second support member may be arranged on an opposite side of the cavity 15 as seen in the width direction of the support arrangement 10.

Each of the first heating element 5 and the second heating element 7 may, when inserted into the first and second insulating bodies 11, 21, respectively, be retained in place in the support arrangement 10 by usage of a respective mounting sleeve 46. Such a mounting sleeve 46 may have the same essentially the same configuration as mounting sleeves used when mounting heating elements on the outside of the furnace and will therefore not be described further in the present disclosure. After having inserted for example the second heating element 7 through the second longitudinal slot 23 in the second insulating body 21, the mounting sleeve 46 is moved in the longitudinal direction of the support arrangement 10 into a mating portion of the second longitudinal slot 23. Thereby, the second heating element 7 is secured in place. The mounting sleeve 46 used for the second heating element 7 may be configured to rest on the support structure 40. Thereby, the mounting sleeve 46 may together with the support structure 40 also be configured to carry the weight of the second heating element 7.

As shown in FIG. 2, the cover body 30 may comprise a longitudinal protrusion 33 configured to, when the cover body 30 is mounted in the support arrangement 10, extend into the first longitudinal slot 13 so as to interact therewith in a male-female relationship. Said protrusion 33 may also be configured to extend into the second longitudinal slot 23 so as to interact therewith in a male-female relationship. Alternatively, the cover body may comprise a plurality of longitudinal protrusions, each longitudinal protrusion of said plurality being configured to extend into a respective longitudinal slot of the insulating bodies 11, 21. Such longitudinal protrusion(s) 33 ensure that the cavity is sufficiently thermally insulated from the interior of the furnace. It should however be noted that the cover body 30 need not comprise such a longitudinal protrusion, in which case the same effect may be achieved by a separate insulating components arranged so as to fill up the portion of the longitudinal slots 13, 23 which are not occupied by the heating elements and mounting sleeves.

Figure 3:
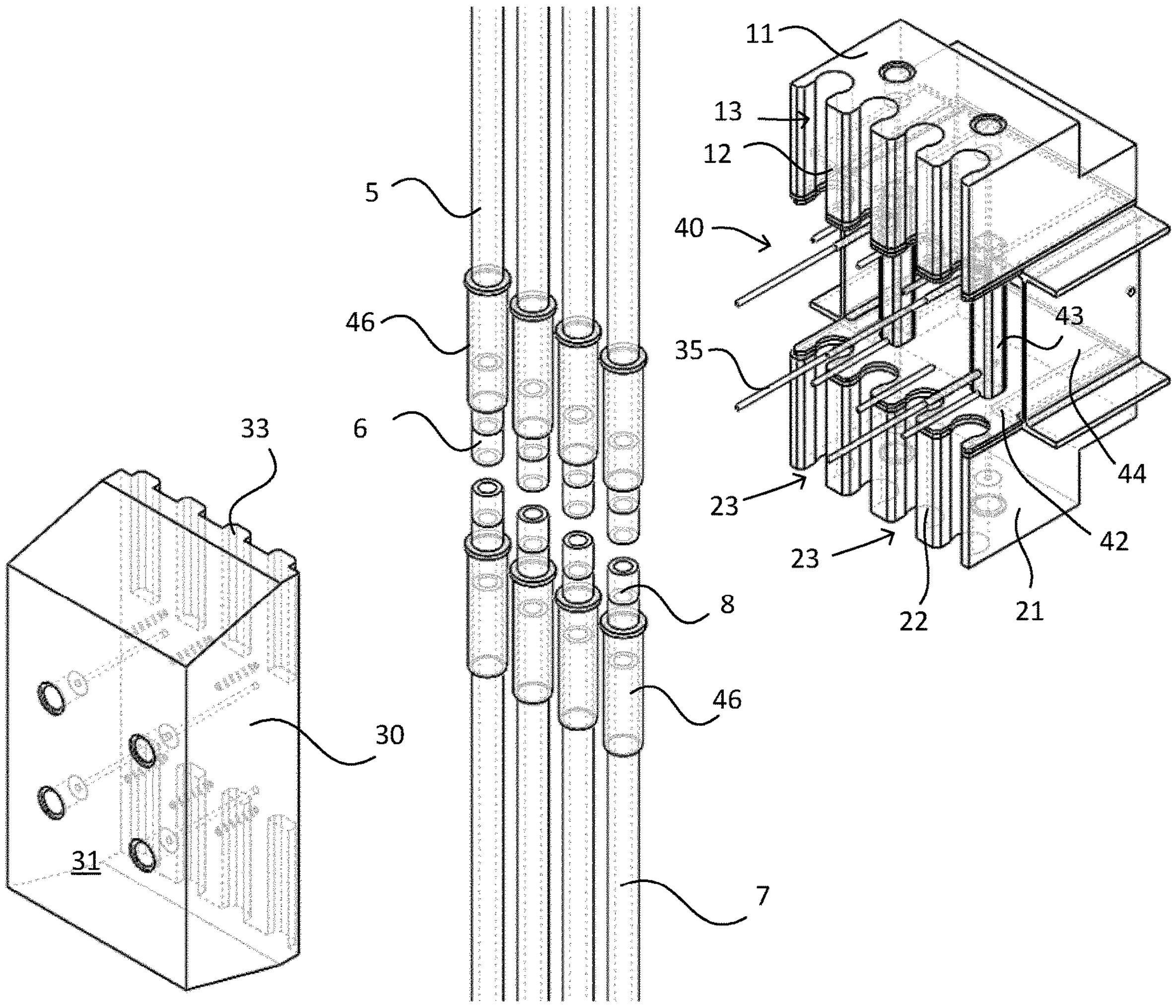
FIG. 3 illustrates an expanded perspective view of a third exemplifying embodiment of the support arrangement according to the present disclosure as well as a plurality of heating elements.

FIG. 3 illustrates an expanded perspective view of a third exemplifying embodiment of the support arrangement 10 according to the present disclosure as well as a plurality of heating elements. The third exemplifying embodiment corresponds to the first and second exemplifying embodiments described above and shown in FIGS. 1 and 2, with the exception that it is configured to support four of said first heating element 5 and four of said second heating element 7. Therefore, the first surface 12 of the first insulating body 11 of the support arrangement 10 according to the third exemplifying embodiment comprises four longitudinal slots 13 arranged in parallel. Said four longitudinal slots may extend through the entire first insulating body 11 in the longitudinal direction of the support arrangement 10 as shown in the figure. Furthermore, the first surface 12 of the second insulating body 21 also comprises four longitudinal slots 23. Moreover, the cover body comprises a plurality of longitudinal protrusions 33, each longitudinal protrusion of said plurality configured to extend into a respective of the longitudinal slots 13, 23 when the cover body 30 in mounted in the support arrangement. The mounting sleeves 46 are here shown when arranged on the respective heating elements.

Figure 4:
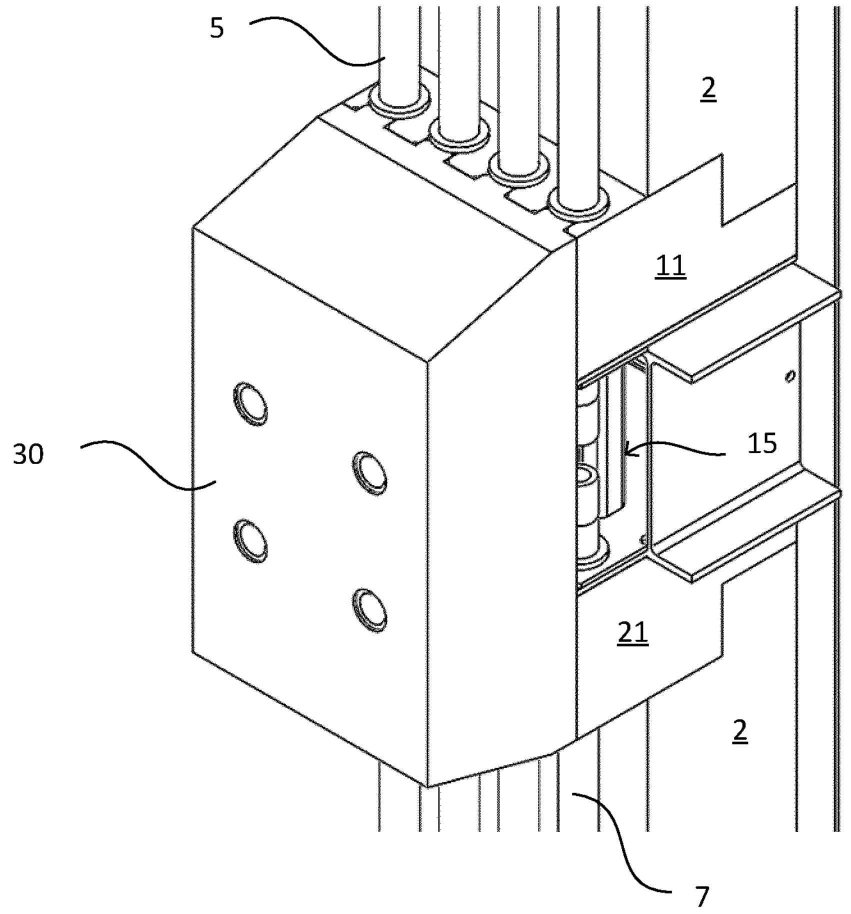
FIG. 4 illustrates a perspective view of the third exemplifying embodiment shown in FIG. 3 when the cover body is mounted in the support arrangement, FIG. 5 schematically illustrates two examples of cross-sectional shapes of longitudinal slots when seen in a plane perpendicular to the longitudinal direction of the support arrangement according to the present disclosure.

FIG. 4 illustrates a perspective view of the third exemplifying embodiment of the support arrangement 10 when the cover body 15 is mounted in the support arrangement 10 and a plurality of heating elements are supported by the support arrangement 10, and when the support arrangement 10 is arranged in a furnace as represented by a wall 2 of the furnace. As shown here, the cavity 15 may partly be open on the sides thereof in case the support arrangement 10 is arranged side by side with an adjacent support arrangement. However, in case the support arrangement 10 is not arranged side by side with an adjacent support arrangement, the portion of the cavity 15 which is arranged inside the furnace is naturally surrounded by additional insulating bodies so as to be thermally protected to the interior of the furnace.

Figure 5:
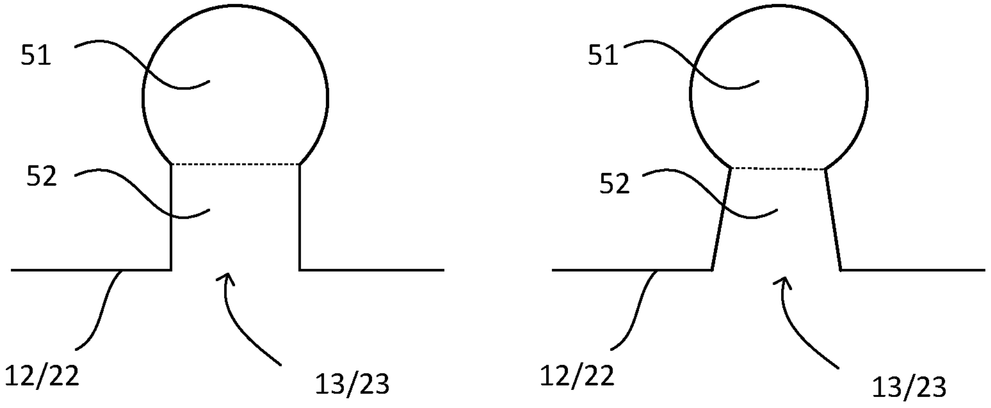

Each of the first and second longitudinal slots 13, 23 described above may have a cross-sectional shape, when seen in a plane perpendicular to the longitudinal direction of the support arrangement, comprising a first portion having a circular shape and a second portion having a trapezoid shape, wherein the second portion opens up in the first surface 12, 22 of the respective insulating body 11, 21. A trapezoid shape shall here be considered to mean a shape having two parallel sides. Examples of trapezoid shape include rectangular shape or the cross-sectional shape of a truncated cone, but are not limited thereto. One of these parallel sides of the trapezoid shape of the above-mentioned second portion coincides with the plane of the first surface 12, 22 of the respective insulating body 11, 21. FIG. 5 schematically illustrates two examples of cross-sectional shape of the longitudinal slots when seen in a plane perpendicular to the longitudinal direction of the support arrangement, wherein the first portion is denominated 51 and the second portion is denominated 52. The first and second portions 51, 52, are in the illustration for sake of clarity differentiated from each other by a dotted line. The second portion 52 may at least partly have a width parallel to the first surface 12/22 which is smaller than the diameter of the first portion. The first portion may be configured to allow insertion of a mounting sleeve, in a direction parallel to the longitudinal direction of the support arrangement, into the longitudinal slot for the purpose of mounting a heat element in the support arrangement when the heating element has been inserted into an insulating body. The fact that the second portion has at least partly a smaller width than the diameter of the first portion may ensure that the mounting sleeve as well as the heating element remains in place.

Figure 6:
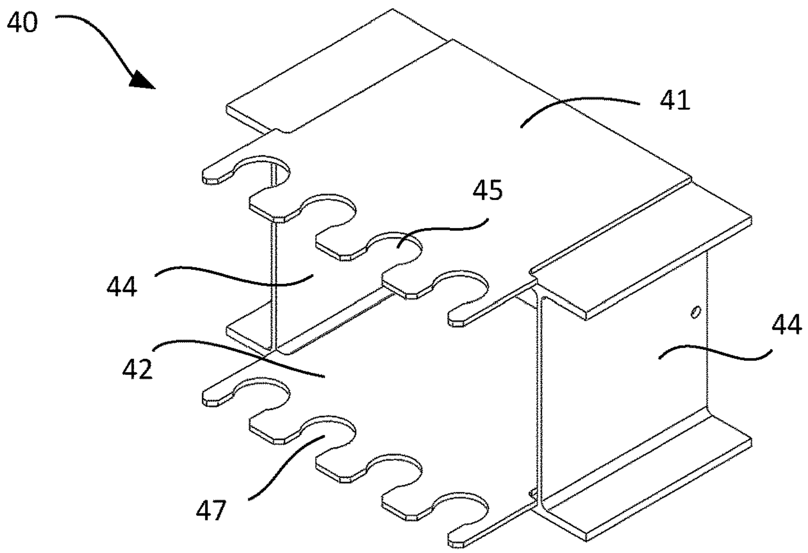
FIG. 6 illustrates a perspective view one exemplifying embodiment of a support structure of the support arrangement according to the present disclosure, FIG. 7 schematically illustrates a cross sectional view of a part of a furnace wherein a plurality of the herein described support arrangement are arranged.

FIG. 6 illustrates a perspective view one exemplifying embodiment of a support structure 40. Said support structure 40 comprises a first support plate 41, a second support plate 42, and two support members 44 as described above. The first support plate 41 may comprise a plurality of cuts 45. Each of these cuts 45 is configured to be arranged along a longitudinal axis of one of the first longitudinal slots 13 in the first insulating body 11 (compare with FIG. 3). Thus, each of the cuts 45 is configured to allow insertion of a first heating element 5 in a direction perpendicular to the longitudinal direction of the support arrangement 10 into said cut 45. Correspondingly, the second support plate 42 may comprise a plurality of cuts 47 for the same purpose.

Figure 7:
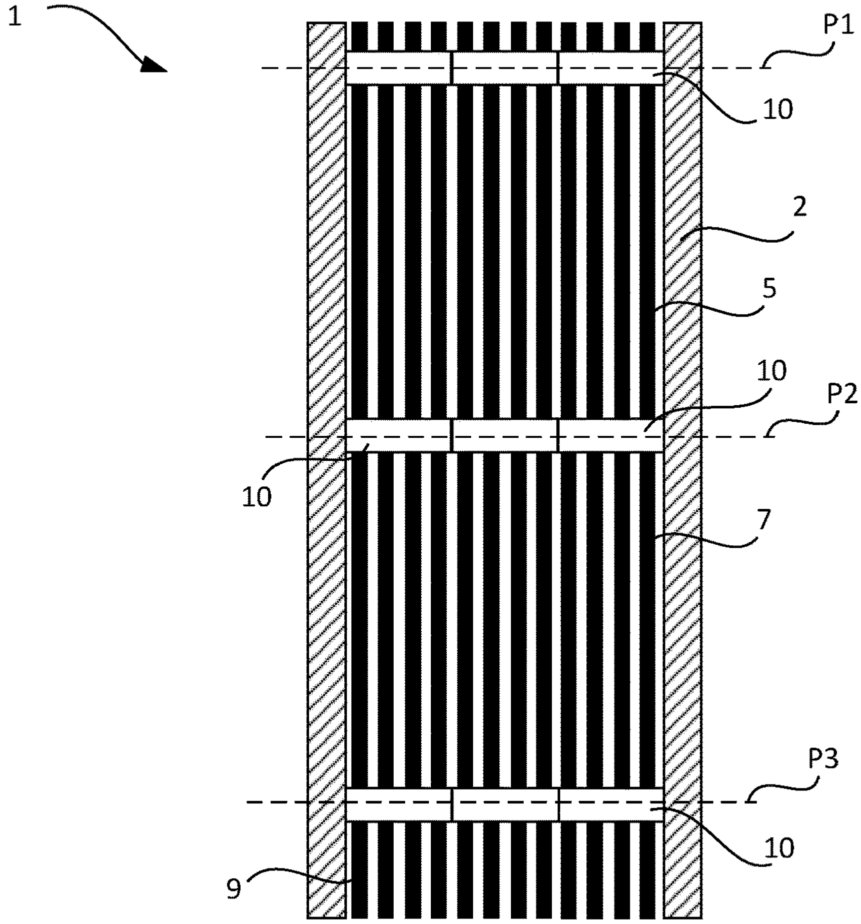

FIG. 7 schematically illustrates a cross sectional view of a part of a furnace 1. Two opposing walls 2 of the furnace are here shown in cross-section. A plurality of first heating elements 5, a plurality of second heating elements 7, and a plurality of third heating elements 9 are mounted inside the furnace 1 (on one wall thereof) by usage of a plurality of support arrangements 10 as described herein. The heating elements are here illustrated to be arranged in a vertical configuration which means that the heating elements extend longitudinally vertically inside the furnace. The plurality of first heating elements are arranged in parallel to each other. Likewise, the plurality of second heating elements are arranged in parallel to each other and the plurality of third heating elements 9 are arranged in parallel to each other. Furthermore, each heating element of the plurality of first heating elements is arranged successively, along a vertical axis, to a heating element of the plurality of second heating elements. Likewise, each heating element of the plurality of second heating elements is arranged successively, along a vertical axis, to a heating element of the plurality of third heating elements. The plurality of support arrangements are here illustrated to be arranged side by side along a first, second and third plane P1, P2, P3 perpendicular to the vertical direction of the furnace.

Figure 8:
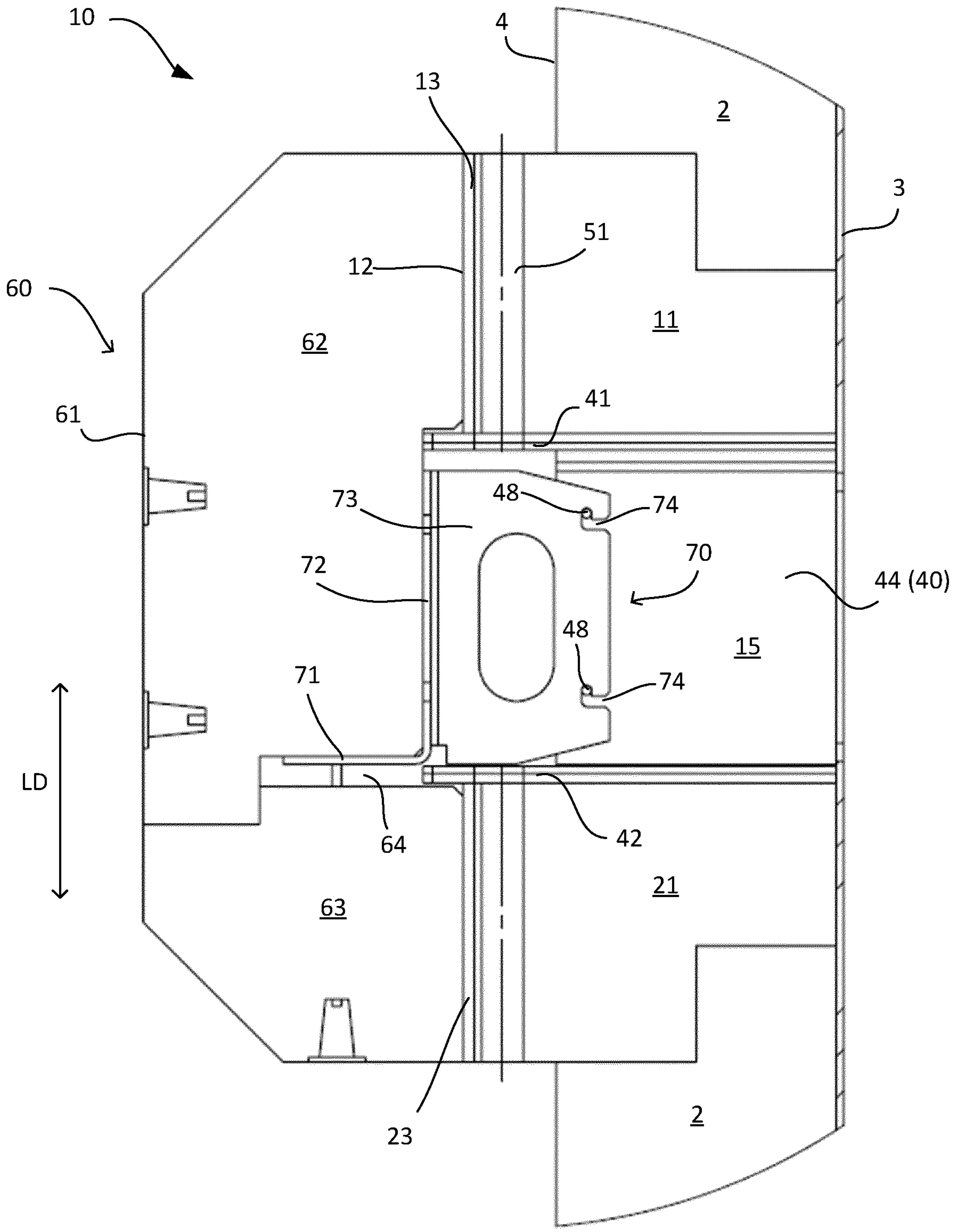
FIG. 8 illustrates a cross sectional view of a fourth exemplifying embodiment of the support arrangement according to the present disclosure.

FIG. 8 illustrates a cross-sectional view of a fourth exemplifying embodiment of the herein described support arrangement 10. The support arrangement 10 is in the figure illustrated when arranged in a furnace (for example the furnace 1 illustrated in FIG. 7), but without any heating elements inserted thereinto. The cross-sectional view is taken in a plane of a common longitudinal axis of the first longitudinal slot 13 and the second longitudinal slot 23, said plane being parallel with the longitudinal direction LD of the support arrangement 10 and perpendicular to the first surface 12 of the first insulating body 11. The furnace is in the figure illustrated by a wall 2 thereof, said wall 2 comprising an outer surface 3 facing the exterior of the furnace and an inner surface 4 facing the interior of the furnace.

The fourth exemplifying embodiment essentially corresponds to the first exemplifying embodiment, except that it, instead of a detachably arranged cover body, comprises a detachably arranged cover assembly 60. The fact that the cover assembly 60 is detachably arranged enables temporarily removing the cover assembly 60 from the rest of the support arrangement 10 during for example replacement of one or more heating elements (not shown).

The cover assembly 60, when mounted in the support arrangement 10, extends over at least a portion of the first surface 12 of the first insulating body 11 and at least a portion of the first surface 22 of the second insulating body 21. The cover assembly 60 thus provides a wall of the cavity 15 formed between the first and second insulating bodies 11, 12 of the support arrangement 10. The cover assembly 60, together with at least the first insulating body 11 and the second insulating body 21, may therefore thermally isolate the volume of the cavity 15 from the interior of the furnace. Moreover, the cover assembly 60 comprises a first surface 61 configured to face the interior of the furnace when the cover assembly 60 is mounted in the support arrangement 10.

The cover assembly 60 may, as shown in the figure, comprise a first constituent part 62 and a second constituent part 63. Said first and second constituent parts 62, 63 are each made of a thermally insulating material, for example the same material as the material of the first and second insulating bodies 11, 21. The first constituent part 62 may, when the cover assembly 60 is mounted in the support arrangement, be arranged so as to abut the first surface 12 of the first insulating body 11. Similarly, the second constituent part 63 may be arranged to abut the first surface 22 of the second insulating body 21 when the cover assembly 60 is mounted in the support arrangement.

The cover assembly 60 may further comprise a mounting assembly 70, as shown in the figure. If so, the first constituent part 62 and the second constituent part 63 may each be permanently attached to the mounting assembly 70. The mounting assembly 70 is configured to allow mounting of the cover assembly 60 to the support structure 40 of the support arrangement 10. Furthermore, the mounting assembly 70 will be thermally insulated from the interior of the furnace when the cover assembly 60 is mounted in the support arrangement 10, and may therefore be made of a metal.

Metal is an appropriate selection of material for the mounting arrangement 70 in order to ensure that it has sufficient capacity for carrying the load of the cover assembly 60.

The mounting assembly 70 may comprise a first portion 71, configured to extend in a plane substantially perpendicular to the longitudinal direction LD of the support arrangement 10 when the cover assembly 60 is mounted in the support arrangement 10. Said first portion 71 of the mounting assembly 70 may be arranged between the first constituent part 62 and the second constituent part 63, for example by extending into an empty space 64 formed between the first constituent part 62 and the second constituent part 63 as shown in the figure. The mounting assembly 70 further comprises a second portion 72 configured to extend in a plane substantially parallel to the longitudinal direction LD of the support arrangement 10 when the cover assembly 60 is mounted in the support arrangement 10. The first portion 71 and the second portion 72 of the mounting assembly 70 may be seen as together forming an L-shape when seen in the cross-sectional view shown in FIG. 8. The mounting assembly 70 further comprises a third portion 73 and a fourth portion (not visible in FIG. 8). The third portion 73 is configured to extend in a plane substantially perpendicular to the plane in which the second portion 72 extends as well as substantially perpendicular to the plane in which the first portion 71 extends. Moreover, the third portion 73 is configured to extend into the cavity 15 when the cover assembly 60 is mounted in the support arrangement 10. The fourth portion (not shown) of the mounting assembly 70 is arranged in parallel to the third portion 73 and may have a configuration mirroring the configuration of the third portion 73. The third portion 73, the second portion 72 and the fourth portion (not shown) may be seen as together forming a substantially U-shaped form if seen in a plane perpendicular to the cross-sectional view shown in FIG. 8, although the present disclosure is not limited thereto.

As mentioned above, the first constituent part 62 and the second constituent part 63 may each be permanently attached to the mounting assembly 70. This may for example be achieved by permanently attaching the second constituent part 63 to the first portion 71 of the mounting arrangement 70 and the first constituent part 62 to the second portion 72 of the mounting arrangement 70. Such an attachment may be made any previously known solution for permanent attachment known in the art, such as by means of appropriate fastening devices (not shown).

Furthermore, as mentioned above, the mounting assembly 70 is configured to allow mounting of the cover assembly 60 to the support structure 40 of the support arrangement 10. This may for example be achieved, as shown in the figure, by each of the third portion 73 and the fourth portion (not shown) of the mounting assembly 70 comprising one or more hook-shaped recesses 74 (two shown in the figure) configured to be hooked onto cooperating pins 48 of the support structure 40, wherein said pins 48 extend from a surface of the second support member 44 of the support structure 40 into the cavity 15.

Alternatively, the cover assembly 60 may be configured to be detachably mounted in the support arrangement 10 by being detachably mounted to the support structure 40 by at least one fastening device, such as the fastening device 35 described in relation to the first exemplifying embodiment shown in FIG. 1 or the second exemplifying embodiment shown in FIG. 2. In such a case, the cover assembly 60 need not necessarily comprise the mounting assembly 70 shown in FIG. 8. The first insulating constituent part 62 and the second insulating constituent part 63 may in such a case be directly attached to each other without any intermediate component, if desired.

The invention claimed is:

1. A support arrangement for mounting electric heating elements in a furnace, the support arrangement being configured for mounting heating elements such that the heating elements extend out from the support arrangement in a longitudinal direction of the support arrangement, the support arrangement comprising:

a first insulating body having a first surface configured to face the interior of the furnace, the first surface of the first insulating body comprising a first longitudinal slot, wherein the first longitudinal slot has a configuration adapted to allow insertion of a first heating element into the first insulating body in a direction perpendicular to the longitudinal direction of the support arrangement;

a second insulating body having a first surface configured to face the interior of the furnace, the first surface of the second insulating body comprising a second longitudinal slot, wherein the second longitudinal slot has a configuration adapted to allow insertion of a second heating element into the second insulating body in a direction perpendicular to the longitudinal direction of the support arrangement; and a support structure configured to support the first insulating body and/or the second insulating body in the furnace, the support structure further configured to at least partly extend into a wall of the furnace when the support arrangement is arranged in the furnace;

wherein the second insulating body, in the longitudinal direction of the support arrangement, is arranged at a distance from the first insulating body so as to form a cavity between the first insulating body and the second insulating body through which each of the first heating element and the second heating element may be electrically connected to a power source via a respective terminal, and the support arrangement further comprising a detachably arranged cover body or cover assembly adapted to, when mounted in the support arrangement, extend over the first surface of the first insulating body and the first surface of the second insulating body so as to form a wall of said cavity.

2. The support arrangement according to claim 1, wherein the first insulating body and the second insulating body are arranged relative each other such that the cavity is adapted to extend through the wall of the furnace when the support arrangement is arranged in the furnace.

3. The support arrangement according to claim 1, wherein each of the first insulating body and the second insulating body is configured to extend through the wall of the furnace when the support arrangement is arranged in the furnace.

4. The support arrangement according to claim 1, wherein the first longitudinal slot extends through the first insulating body in the longitudinal direction of the support arrangement, and/or the second longitudinal slot extends through the second insulating body in the longitudinal direction of the support arrangement.

5. The support arrangement according to claim 1, wherein the first longitudinal slot has a cross-sectional shape, when seen in a plane perpendicular to the longitudinal direction of the support arrangement, comprising a first portion having a circular shape and a second portion having a trapezoid shape, the second portion at least partly having a width parallel to the first surface of the first insulating body which is smaller than the diameter of the first portion, said second portion opening up in the first surface of the first insulating body, said first portion configured to allow insertion of a mounting sleeve, in a direction parallel to the longitudinal direction of the support arrangement, into the first longitudinal slot for the purpose of mounting the first heating element in the support arrangement when said first heating element has been inserted into the first insulating body.

6. The support arrangement according to claim 1, wherein the support structure comprises:

a first support plate arranged at an upper side of the cavity, as seen in the longitudinal direction of the support arrangement, and in parallel to a second surface of the first insulating body, said second side of the first insulating body facing the cavity, a second support plate arranged at a lower side of the cavity, as seen in the longitudinal direction of the support arrangement, and at least one support member connecting the first support plate with the second support plate, the at least one support member having a longitudinal extension parallel to the longitudinal direction of the support arrangement.

7. The support arrangement according to claim 6, wherein the at least one support member extends through the cavity and/or wherein the at least one support member forms a wall of said cavity.

8. The support arrangement according to claim 1, wherein the cover body or the cover assembly is configured to be detachably mounted to the support structure by at least one fastening device.

9. The support arrangement according to claim 1, wherein the cover body or the cover assembly comprises a longitudinal protrusion configured to, when the cover body or the cover assembly is mounted in the support arrangement, extend into the first longitudinal slot so as to interact therewith in a male-female relationship.

10. The support arrangement according to claim 1, wherein the first longitudinal slot and the second longitudinal slot are arranged along a common longitudinal axis in the support arrangement.

11. The support arrangement according to claim 1, wherein the first surface of the first insulating body comprises a plurality of said first longitudinal slot arranged in parallel to each other, each of said plurality of first longitudinal slot having a configuration adapted to allow insertion of a respective heating element into the first insulating body in a direction perpendicular to the longitudinal direction of the support arrangement.

12. The support arrangement according to claim 1, wherein the first insulating body and the second insulating body have the same geometrical configuration, but the second insulating body is arranged so as to mirror the first insulating body relative to a plane perpendicular to the longitudinal direction of the support arrangement.

13. A furnace comprising the support arrangement according to claim 1.

14. The furnace according to claim 13, wherein the support arrangement is arranged in the furnace such that the longitudinal direction thereof is parallel with a wall of the furnace.

15. The furnace according to claim 13, wherein the support arrangement is arranged in the furnace such that the longitudinal direction thereof is parallel with a longitudinal axis of the furnace.

* * * * *